United States Patent [19]

Kennedy

[11] 4,377,360
[45] Mar. 22, 1983

[54] CHANNEL NUT AND METHOD OF MAKING SAME

[75] Inventor: Edward S. Kennedy, Strongsville, Ohio

[73] Assignee: Wire Products Company, Inc., Cleveland, Ohio

[21] Appl. No.: 146,519

[22] Filed: May 5, 1980

[51] Int. Cl.³ .............................................. F16B 37/04
[52] U.S. Cl. .................................. 411/116; 411/153; 411/185; 10/86 R
[58] Field of Search ............... 411/116, 166, 112, 104, 411/111, 103, 121, 134, 132, 153, 133, 85, 84, 171, 537, 538, 371, 372, 432, 184, 185; 10/86 R, 86 W, 86 A

[56] References Cited

U.S. PATENT DOCUMENTS

| | | | |
|---|---|---|---|
| 1,671,757 | 5/1928 | Allen | 411/104 |
| 2,737,268 | 3/1956 | Smith | 411/166 X |
| 2,767,951 | 10/1956 | Cousino | 411/116 X |
| 2,944,642 | 7/1960 | Evans | 411/166 X |
| 3,005,292 | 10/1961 | Reiland | 411/116 X |

FOREIGN PATENT DOCUMENTS

| | | | |
|---|---|---|---|
| 761740 | 11/1956 | United Kingdom | 411/153 |
| 794206 | 4/1958 | United Kingdom | 411/171 |

*Primary Examiner*—Ramon S. Britts
*Attorney, Agent, or Firm*—Fay & Sharpe

[57] ABSTRACT

A channel nut for space framing systems characterized by having a pair of outwardly and downwardly extending arms which form a channel, a machine nut which is securely fastened thereto, and a resilient spring projecting upwardly from the machine nut. Such channel nuts are used to thread bolts into space framing members to secure lighting fixtures and the like into ceilings particularly for commercial utilization in plants and other buildings. The channel framing may be extended horizontally or vertically, and the channel nut must have some ability to withstand lateral thrusts so that it grips firmly into slots of the channel framing.

The channel nuts of this invention include ordinary machine nuts of the square, hexagonal or elongated rectangular type, which are projection welded to the saddle to strengthen it.

The method of making this channel nut consists of taking strip, punching through the strip for the threaded opening, serrating the stock at its ends, cutting the stock into pieces, chamfering the diagonal corners, and forming the pieces into a channel by bending the arms downwardly. Then a slot is cut into the sides of the channel for a spring, a nut is projection welded onto the channel over the opening, with the nut being square, hexagonal or elongated rectangular in shape, and the spring is secured in the channel in the slot by peening.

3 Claims, 16 Drawing Figures

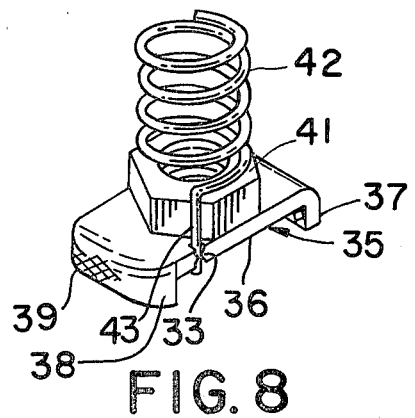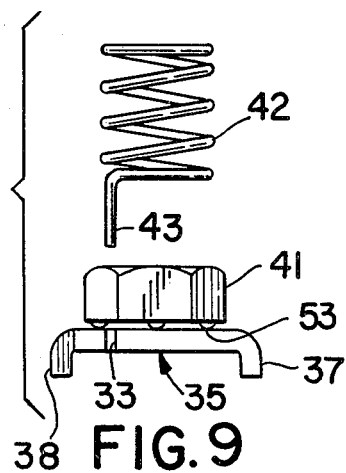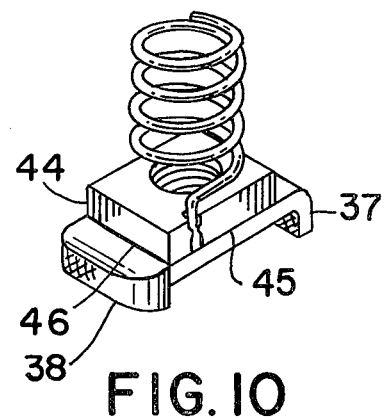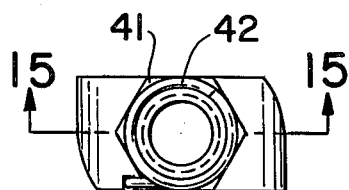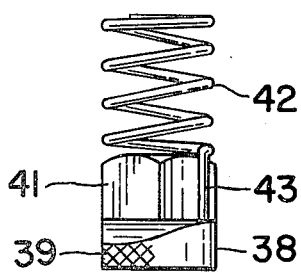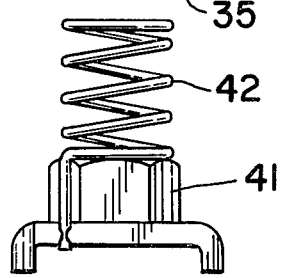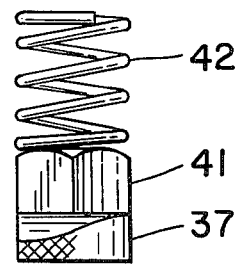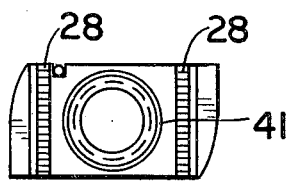

CHANNEL NUT AND METHOD OF MAKING SAME

BACKGROUND OF THE INVENTION

Metal framing systems, which are also referred to as space framing systems, have been known for over fifty years. Such systems basically comprise a channel nut with a spring on one side thereof and a pair of arms which extend outwardly, and the nuts are designed to move through an opening in a channel. Outwardly extending arms project into the channel slot on the side while the spring holds the nut in position.

In practice, a channel nut is inserted anywhere along a continuous slot of metal framing or channel structure. A 90° turn positions the outstanding arms in the grooves of the metal framing, and the chamfered or rounded nut ends make insertion easy. The spring then forces the nut into position and holds it tightly either in the vertical or horizontal position.

A connection may then be made with a threaded fastener into the channel nut so that it remains in position in the metal framing.

Examples of the prior art of this invention are exemplified by the following U.S. patents:

U.S. Pat. No. 3,433,910—C. H. LaLonde et al.
U.S. Pat. No. 2,345,650—C. W. Attwood
U.S. Pat. No. 2,696,139—C. W. Attwood
U.S. Pat. No. 2,767,609—W. F. Cousino

SUMMARY OF THE INVENTION

The invention relates to a new method of making a channel nut and to the structure of the nut itself which is particularly adapted for use with space framing systems. The nut of this invention includes a pair of outwardly and downwardly extending arms formed from thin metal stock, and a machined nut which is fastened thereon and may or may not include a resilient spring projecting in the opposite direction from the channel to hold the nut in position in a space framing system.

The nut is characterized by having a saddle member which is made of thin stock. The nut includes an opening which is located in the saddle and the machine nut is fixedly attached to the saddle over the saddle opening. The opening normally is made a little larger to provide for a countersink easy insertion of a fastener. The spring then is attached to a slot which is formed in the saddle, and it projects over the nut to hold it in position.

The nuts of this invention are made by taking strip stock and forming an opening in the stock at periodic intervals by punching. The strip is then serrated on one or both sides thereof at intervals between the punches. The strip is cut into pieces between the openings, and a chamfer cuts the die in the opposite corners to allow the nut to rotate upon insertion through a channel opening into the channel slot. Pieces are then formed into channels by bending the arms downwardly. A slot is cut into the sides of the channel for a spring, and the machine nut is projection welded onto the channel over the opening, and, of course, the spring is secured into the channel in the slot, generally by peening.

The method and structure of this invention produces a superior channel nut in that it is formed of strip stock, and a portion of it is a machine nut, which may be made on standard nut making machinery and need not be of a specially formed piece, die cast or machined.

A machine nut may be square, hexagonal or multi-sided. In one form a square nut is used; in another form a hex nut is used with the major axis of the hexagonal nut being across and extending in opposite direction on the arms to strengthen it; and in still another form, an elongated rectangular nut is used that extends along the length of the saddle to strengthen it in its major dimension as it is stressed.

BRIEF DESCRIPTION OF THE DRAWINGS

Details of the preferred embodiment of this invention are described in detail in this specification and are illustrated in the accompanying drawings which form a part hereof, wherein:

FIG. 8 is a schematic view of a completed channel nut;

FIG. 9 is an exploded view, showing the parts of the channel nut with the saddle, the machine nut and the spring in position for assembling;

FIG. 10 is an alternate modification using an elongated rectangular nut for the channel nut;

FIG. 11 is a top plan view of a channel nut according to FIGS. 8 and 9;

FIG. 12 is a left side view of the channel nut;

FIG. 13 is an elevational view of the channel nut;

FIG. 14 is a right side view of the channel nut;

FIG. 15 is a cross-sectional view along the lines 15—15 of FIG. 11; and

FIG. 16 is a bottom view of the channel nut.

DESCRIPTION OF THE PREFERRED EMBODIMENT

Figure 1:
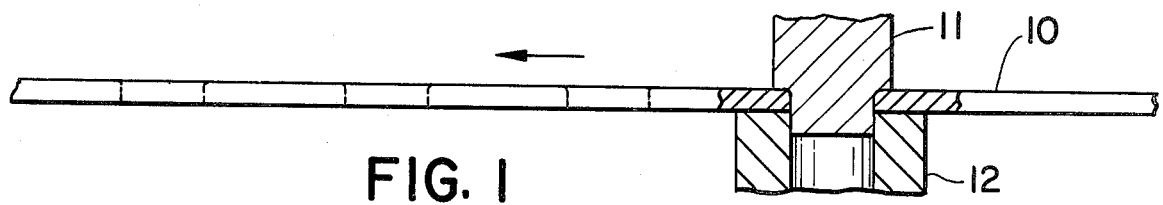
FIG. 1 is a schematic view of the strip stock being punched.

The invention consists of a channel nut formed from strip stock, which may be 0.156" approximately in thickness, as shown in FIG. 1 at 10, in which a punch is diagrammatically shown at 11 and punches a hole which is circular in shape in the strip stock and performed in a fixture 12. The strip is moved in increments from right to left.

Figure 2:
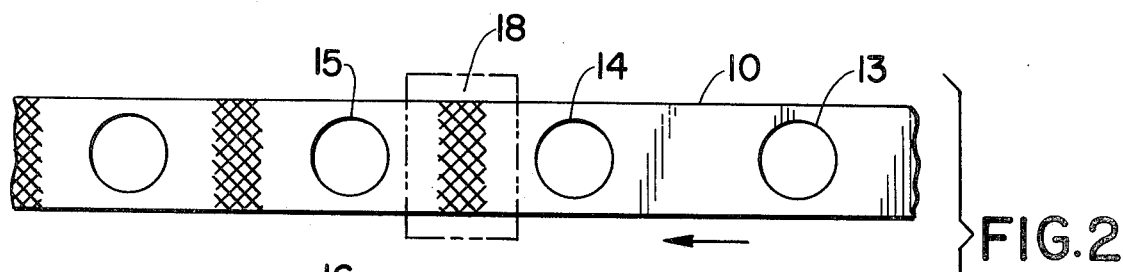
FIG. 2 is a top elevational view of the strip stock being serrated on both its upper and lower faces.

FIG. 2 shows the same strip stock 10 having a series of openings 13, 14 and 15, and a metal serrating punch is in position at 16 and 17. These are moved reciprocally, serrating the strip across its entire width as at 18 and along a portion of the length of the strip.

The next step (FIG. 3) shows a die block 20 which is cut by means of a reciprocating die 21 through that section of the strip which has already been serrated, generally shown in this view at 19.

Figures 3, 4:
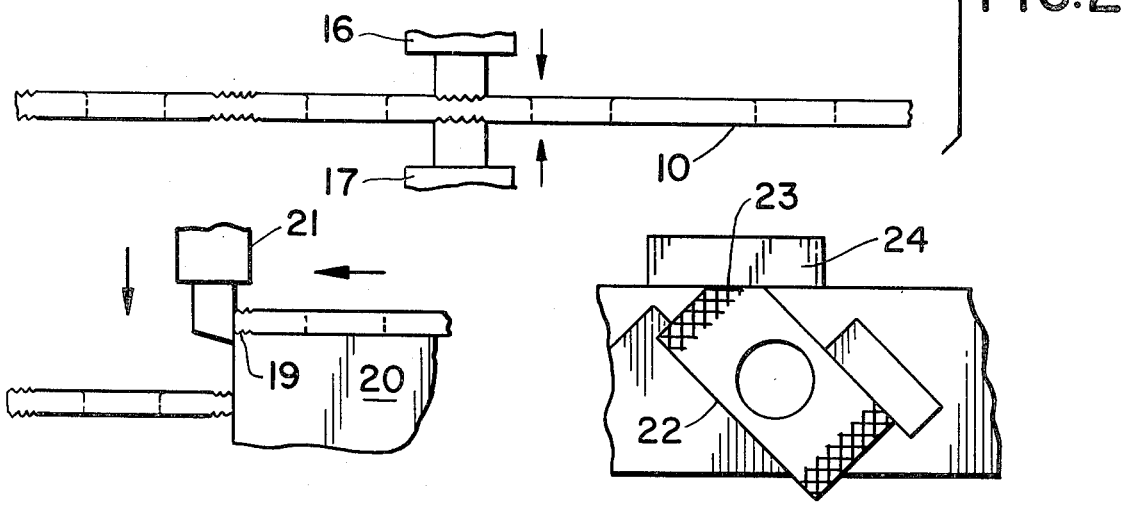
FIG. 3 is a schematic view of the cutoff operation, showing the strip being cut into pieces before forming the saddle.
FIG. 4 is a schematic view of the chamfer operation, showing chamfering of the opposite corners of the pieces.

Each piece, designated 22 in FIG. 4, is placed in a fixture and the corner chamfered as seen at 23 by means of a die 24, which reciprocates. The opposite corner is cut off in a similar manner.

Figures 5, 6:
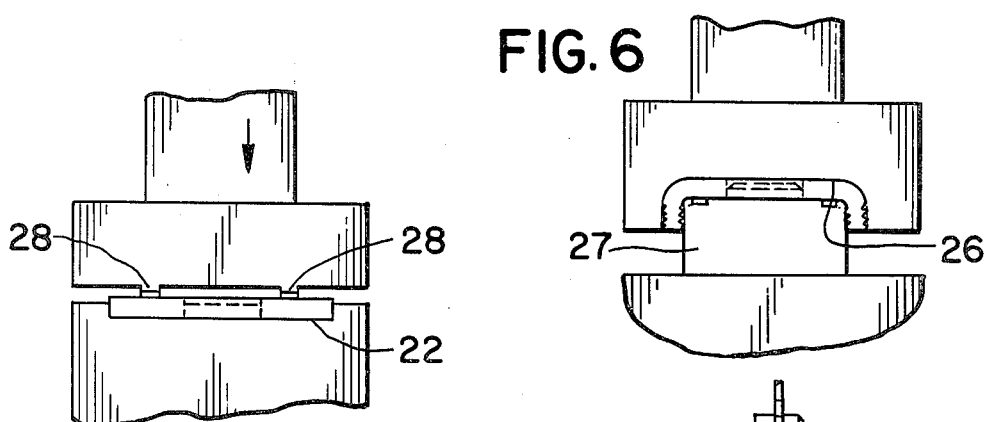
FIG. 5 shows a further operation serrating the pieces.
FIG. 6 illustrates the operation of bending over of the extending arms of the piece to form the channel.

In FIG. 5, each piece is then serrated at 28 on the underside thereof.

Next, the piece is inverted and the outwardly extending arms bent down in a die as shown in connection with FIG. 6. The die member includes a hollowed out structure, generally 26. The die block is shown at 27, which represents the interior face of the channel. The die reciprocates to bend the arms down against the die block 27.

Figure 7:
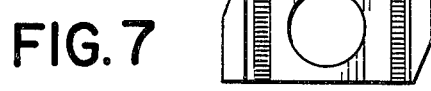
FIG. 7 is a schematic diagrammatic view of the saw slot into which the end of the spring is designed to fit.

FIG. 7 shows the formation of the slot by means of machine 32 which forms the slot along the length of the channel while the parts are fed down a line cutting a groove or slot 33 in the channel. This operation can be performed by punching.

The completed and assembled channel nut is shown in connection with FIG. 8, generally at 35. A channel portion 36 is noted together with a downwardly extending arm on one side at 37 and on the opposite side at 38. The corners are rounded or chamfered as at 39 in order to permit the part to be rotated into the channel slots. The opposite diagonal corner is also chamfered. A machine nut is secured over the opening designated 40, which in this instance is a hexagonal nut 41. A spring 42 is fastened by means of an arm 43 which projects downwardly into slot 33 where it is peened and secured in position.

FIG. 9 shows the parts prior to final assembly, wherein the channel member 35 is fastened to the machine nut, in this instance a hexagonal nut 41, which has a series of projections designated 53 and are projection welded onto the channel.

FIG. 10 is an alternate modification in which the nut 44 is shown as an elongated rectangular nut with its long dimension 45 extending along the width of the channel member to the oppositely extending arms 37 and 38. The shorter dimension 46 extends across the channel and parallel to the arms.

FIG. 11 is a top view of the same arrangement in which the spring 42 is positioned over the nut 41 and on top of the channel member 35.

FIGS. 12, 13 and 14 show the relative positions of the left front, elevation and right side of the same nut with the parts in position. The long axis of the hexagonal nut extends near the downwardly extending arms to support the channel nut, which is, of course, weakened in cross section by the opening 40 in the nut, but the projection welding of the machine nut strengthens the section so that in pull out, it incurs more than sufficient strength.

FIG. 15 shows the nut with the spring removed. The opening 40 is slightly larger than the threaded section of the machine nut 41 to permit easy entrance of a threaded fastener into the nut. Serrations 28, which were formed in FIG. 5, are clearly seen on the underside of the channel in this view and that of FIG. 16.

FIG. 16 shows the bottom view of the extending arms and serrations 28.

The obvious advantage of this particular method of making channel nuts is that ordinary low-carbon steel may be used for the channel forming the downwardly extending arms with a machine nut projection welded thereon. This provides the best combination of strip stock and a machine made part with the advantage of lower cost of manufacture. The serrations on the channel underside will seat better into space framing channels, and, when threaded in position, give greater strength in a lateral direction to prevent slippage. Some of the nuts are fastened in a dependent position where they would not incur lateral thrust. Others, however, are positioned on vertical or angled struts where lateral thrusts present a problem. If tension is reduced or vibration imposed upon the part, there is a tendency for channel nuts and their arms to shift, and therefore serrations are necessary for gripping onto the channel framing structure. By countersinking and making the opening in the strip stock somewhat larger, the threaded fastener may be inserted easily into the threaded section of the machine nut.

The invention has been described with reference to a preferred embodiment. Obviously, modifications and alterations will occur to others upon the reading and understanding of this specification. It is the intent herein to include all such modifications and alterations insofar as they come within the scope of the appended claims or the equivalents thereof.

What is claimed is:

1. A channel nut for space framing systems characterized by a pair of outwardly and downwardly extending arms, a machine nut and a resilient spring projecting upwardly from said channel nut, said channel nut comprising:
   (a) a saddle member of thin stock having a pair of arms extending downwardly from each end and forming the saddle;
   (b) the saddle member having an opening centrally located therein;
   (c) a machine nut fixedly attached to said saddle with the threaded opening in said nut positioned over said saddle opening;
   (d) a resilient spring being fastened to said saddle; and
   (e) the machine nut being hexagonal in shape with its long axis extending near the downwardly extending arms to strengthen the saddle.

2. A channel nut for space framing systems characterized by a pair of outwardly and downwardly extending arms, a machine nut and a resilient spring projecting upwardly from said channel nut, said channel nut comprising:
   (a) a saddle member of thin stock having a pair of arms extending downwardly from each end and forming the saddle;
   (b) the saddle member having an opening centrally located therein;
   (c) a machine nut fixedly attached to said saddle with the threaded opening in said nut positioned over said saddle opening;
   (d) a resilient spring being fastened to said saddle; and
   (e) the machine nut being of elongated rectangular shape with its long side extending near the downwardly extending arms to strengthen the saddle.

3. A method of forming a saddle for space framing systems from strip stock wherein the said nut is adapted to seat in channel framing slots and wherein a machine nut is secured to a channel for forming a saddle with arms extending outwardly and then downwardly and a spring is secured thereto for positioning the machine nut in the channel framing, said method comprising:
   (a) forming an opening in strip stock at regular intervals;
   (b) serrating the stock on at least one side between the openings;
   (c) cutting the strip stock into pieces between the openings;
   (d) chamfering the diagonally opposite corners of the strip stock to allow the channel nut to rotate upon insertion of same through a channel opening into a channel slot;
(e) serrating the pieces on their undersides;
(f) forming the pieces into a channel by bending the arms downwardly;
(g) cutting or punching a slot into the side of the channel for a spring;
(h) projection welding a machine nut onto said channel over said opening; and
(i) securing a spring onto said channel in said slot.

* * * * *